Aug. 21, 1928.
W. MENDEL
1,681,900
CELLULOSE XANTHATING PROCESS
Filed May 1, 1926
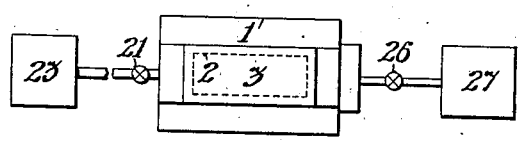
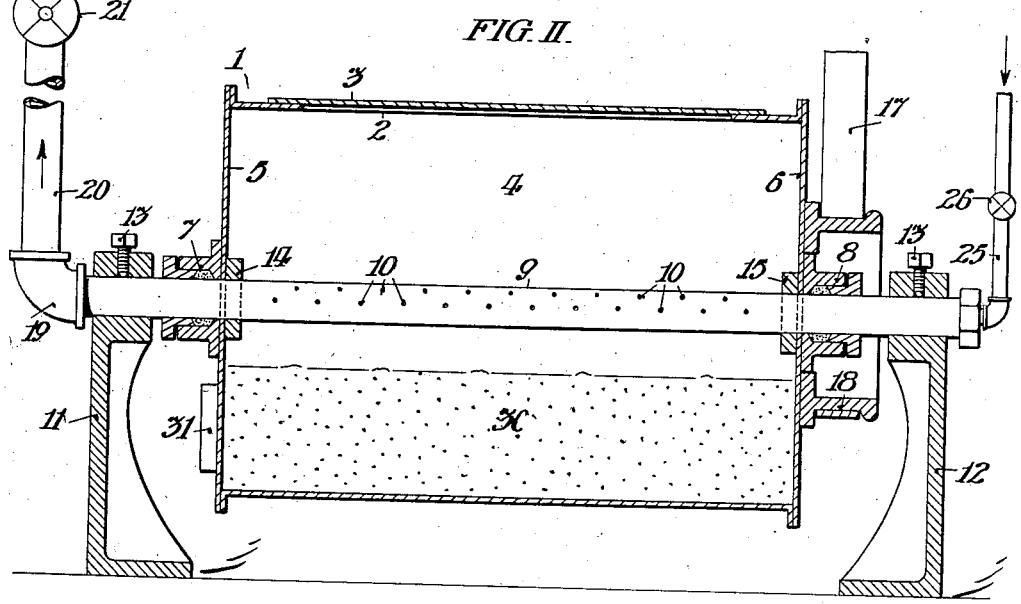
INVENTOR:
WILLIAM MENDEL, Patented Aug. 21, 1928.

1,681,900

UNITED STATES PATENT OFFICE.

WILLIAM MENDEL, OF BEVERLY, NEW JERSEY, ASSIGNOR TO SAMUEL A. NEIDICH, OF EDGEWATER PARK, NEW JERSEY.

CELLULOSE-XANTHATING PROCESS.

Application filed May 1, 1926. Serial No. 106,155.

My invention may be employed with particular advantage in the manufacture of viscose, which is variously known as cellulose sulphocarbonate or cellulose thiocarbonate. Such viscose is conveniently produced by subjecting comminuted wood to the action of an aqueous solution of sodium hydroxide, which separates the lignone from the cellulose, so that it may be withdrawn with such aqueous solution, leaving what is known to the trade as "alkali-cellulose" or "crumbs". Such alkali-cellulose crumbs are then subjected to the action of carbon bisulphide, $CS_2$, to produce cellulose xanthate, and my invention relates particularly to steps in the process preceding and following such $CS_2$ reaction.

Such crumbs normally contain not only a large percentage of uncombined water, but considerable atmospheric air which, of course, contaminate the carbon bisulphide applied thereto, and weaken the action thereof. However, it is the usual practice to proceed to subject masses of such alkali-cellulose crumbs to the action of carbon bisulphide, in any suitable container, without any attempt to eliminate the occluded air and water from such masses, with the consequence that the reaction is correspondingly retarded.

Therefore, it is an object and effect of my invention to facilitate the $CS_2$ reaction by eliminating such surplus moisture and occluded air from the cellulose crumbs before subjecting the same to the action of carbon bisulphide and with the advantage that the crumbs are thereby rendered more porous and receptive to the carbon bisulphide and the latter is not contaminated or diluted by such air and moisture. Moreover, after the ordinary xanthating process aforesaid has effected the desired action upon the cellulose, the latter is liable to deteriorate by further action of the carbon bisulphide remaining occluded in the mass and, upon opening the container, the carbon bisulphide fumes thus liberated may explode and, in any event, are unhealthful and dangerous to the operator.

Therefore, a further object and effect of my invention is to eliminate all surplus carbon bisulphide fumes from the mass of sodium xanthate, when the latter reaches the desired stage and before exposing the same to the atmosphere.

The advantages aforesaid are attained, in accordance with my invention, by secluding a mass of such crumbs and subjecting them to a partial vacuum until the occluded air and water vapor are evacuated therefrom, before subjecting such crumbs to the action of carbon bisulphide to transform them into cellulose xanthate; and by again subjecting the mass to the action of a partial vacuum, when the desired stage of transformation is reached, to eliminate the surplus carbon bisulphide fumes therefrom, and thus not only terminate the action of the latter upon the cellulose, but avoid the aforesaid menaces to the operator incident to opening the container.

My invention includes the various novel features of procedure hereinafter more definitely specified.

In said drawings; Fig. I is a diagrammatic plan view of apparatus which may be conveniently employed in effecting my process.

Fig. II is a vertical sectional view of the rotary churn indicated in Fig. I, but on a larger scale.

In said figures; the churn 1 conveniently includes a hexagonal tubular body having an opening 2 in one side thereof provided with the removable cover 3 which may be hermetically secured thereon by any convenient means, to temporarily close the chamber 4 in said churn and exclude the same from the outer atmosphere. Said churn includes the opposite end closures 5 and 6, which are provided with respective stuffing boxes 7 and 8, and is mounted to rotate upon the tubular shaft 9 which is perforated at 10 and is held in stationary position in the standards 11 and 12, by the set screws 13. Said churn is held in predetermined axial position on said shaft 9 by the collars 14 and 15 which are respectively rigidly, but detachably, connected with said shaft 9 adjacent to said closures 5 and 6.

Said churn 1 may be rotated by any convenient means, for instance by the belt 17 which encircles the pulley 18 which is rigidly connected with said end closure 6. Said shaft 9, which may be a commercial size wrought iron pipe, is operatively connected, by the elbow 19, with the exhaust pipe 20, which may be opened and closed by the valve 21 and extends in communication with any suitable evacuating means capable of producing a partial vacuum in the chamber 4 of said churn; for instance the vacuum pump 23.

Said tubular shaft 9 is also connected with the pipe 25 which is arranged to be opened and closed by the valve 26 and extends to any suitable source of carbon bisulphide, for instance the container 27.

The apparatus above described may be utilized to effect my process as follows: Said cover 3 being removed, a mass of alkali-cellulose 30 may be deposited in said chamber 4 through said churn opening 2 and said cover 3 be replaced in fluid tight relation with said churn 1. Said valve 26 being closed and said valve 21 opened; said chamber 4 may be evacuated by suction upon pipe 20, while said mass 30 is agitated in said chamber 4 by rotation of the churn 1 by said belt 17. Said churn 1 is conveniently provided with the gauge 31 indicating the pressure of the atmosphere in said chamber 4 and, when it indicates that the secluded and confined atmosphere in said chamber has been evacuated to the desired degree; said valve 21 may be closed and said valve 26 opened to introduce carbon bisulphide to said chamber.

As above contemplated, the evacuation of said chamber 4 and its contents, while in communication with the vacuum pump 23, or other suitable means, not only removes the air normally occluded in the mass of crumbs 30 and deprives the latter of the residual moisture remaining from previous treatment thereof, but thus renders said crumbs porous and abnormally receptive to the action of said carbon bisulphide which reacts with the cellulose of said crumbs while the mass of the latter is continually agitated by rotation of said churn 1.

The reaction of said carbon bisulphide upon said alkali-cellulose progressively reduces the latter to cellulose-xanthate and, when that action has continued to the desired extent; it may be immediately checked and terminated by closing said valve 26, (thus disconnecting said churn chamber 4 from the source 27 of said carbon bisulphide,) and reopening said valve 21 to reestablish communication between said churn chamber 4 and the evacuating means 23. The fumes of carbon bisulphide are thus not only quickly exhausted from said churn chamber 4 but also removed from the mass of xanthate then resulting from the reaction aforesaid upon said crumbs 30. Consequently, said churn closure 3 may be removed to permit the xanthate to be discharged from said chamber 4, without any danger of explosion or discomfort to the operator. Thereupon, the operation above described may be repeated.

As above contemplated; my invention is characterized by two distinct features; first, I have discovered that occluded water vapor and air mechanically limit the penetration of carbon bi-sulphide vapors, with respect to alkali cellulose crumbs, in the reaction to form xanthate, and that the reaction is effected more rapidly and completely if such air and vapor are removed to permit the reagent $CS_2$ to do its work in the interior of the mass. Second, that upon completion of such reaction; immediately evacuating the fumes of $CS_2$ from said mass, without opening the container, has three important advantages, to wit, deterioration of the cellulose which is the inevitable consequence of continuance if the reaction, is prevented; the liability to explosion incurred by opening the container to liberate said fumes is obviated; and the incident menace to the health of the operator by inhalation of such fumes is avoided.

Although I have found it convenient to employ apparatus constructed and arranged as above described, it is obvious that such apparatus is not essential to effect my improved process. Therefore, I do not desired to limit myself to the precise details of construction, arrangement, or procedure above set forth, as it is obvious that various modifications may be made therein without departing from the essential features of my invention as defined in the appended claims.

I claim:

1. A cellulose xanthating process, which includes subjecting a mass of alkali-cellulose to a vacuum, while agitating said mass, until air and water vapor are exhausted therefrom; then subjecting said evacuated mass to the action of carbon bisulphide, while agitating said mass, until it is transformed to cellulose xanthate; then subjecting said mass to the action of a vacuum, while agitating said mass, until the fumes of carbon bisulphide are exhausted therefrom.

2. A cellulose xanthating process, which includes subjecting a mass of alkali-cellulose to a vacuum, until air and water vapor are exhausted therefrom; then subjecting said evacuated mass to the action of carbon bisulphide, until it is transformed to cellulose xanthate; then subjecting said mass to the action of a vacuum, until the fumes of carbon bisulphide are exhausted therefrom.

3. A cellulose xanthating process, which includes subjecting a mass of alkali-cellulose to the action of carbon bisulphide, while agitating said mass, until it is transformed to cellulose xanthate; then subjecting said mass to the action of a vacuum, while agitating said mass, until the fumes of carbon bisulphide are exhausted therefrom.

4. A cellulose xanthating process, which includes subjecting a mass of alkali-cellulose to the action of carbon bisulphide, until it is transformed to cellulose xanthate; then subjecting said mass to the action of a vacuum, until the fumes of carbon bisulphide are exhausted therefrom.

5. A cellulose xanthating process which includes transforming a mass of alkali-cellulose to cellulose xanthate in a confined reactive chemical, atmosphere containing $CS_2$, while agitating said mass; then exhausting said chemical atmosphere from said mass, before exposing said mass to the outer normal atmosphere.

6. A cellulose xanthating process which includes transforming a mass of alkali-cellulose to cellulose xanthate in a confined, reactive chemical, atmosphere containing $CS_2$; then exhausting said reactive chemical atmosphere from said mass, before exposing said mass to the outer normal atmosphere.

7. A cellulose xanthating process which includes transforming a mass of alkali-cellulose to cellulose xanthate in a confined chemical atmosphere containing all of the reactive material capable of effecting such transformation; then exhausting said chemical atmosphere from said mass, before exposing said mass to the outer normal atmosphere; and recovering the chemical value of said atmosphere for subsequent use.

In testimony whereof, I have hereunto signed my name at Burlington, New Jersey, this 27th day of April, 1926.

WILLIAM MENDEL.